United States Patent
Rakesh et al.

(10) Patent No.: US 11,063,650 B2
(45) Date of Patent: Jul. 13, 2021

(54) METHOD, NETWORK SIDE DEVICE AND TERMINAL FOR INDICATING PILOT PRECODING MODE

(71) Applicant: CHINA ACADEMY OF TELECOMMUNICATIONS TECHNOLOGY, Beijing (CN)

(72) Inventors: Tamrakar Rakesh, Beijing (CN); Qiubin Gao, Beijing (CN); Xin Su, Beijing (CN); Hui Li, Beijing (CN); Runhua Chen, Beijing (CN); Qiuping Huang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/623,375

(22) PCT Filed: Apr. 13, 2018

(86) PCT No.: PCT/CN2018/083112
§ 371 (c)(1),
(2) Date: Dec. 16, 2019

(87) PCT Pub. No.: WO2018/228043
PCT Pub. Date: Dec. 20, 2018

(65) Prior Publication Data
US 2020/0186225 A1    Jun. 11, 2020

(30) Foreign Application Priority Data

Jun. 16, 2017    (CN) .......................... 201710459281.0

(51) Int. Cl.
*H04B 7/02* (2018.01)
*H04L 1/02* (2006.01)
(Continued)

(52) U.S. Cl.
CPC ......... *H04B 7/0665* (2013.01); *H04B 7/0634* (2013.01); *H04L 5/0051* (2013.01)

(58) Field of Classification Search
CPC .. H04B 7/0665; H04B 7/0634; H04B 7/0456; H04B 7/0619; H04L 5/0051;
(Continued)

(56) References Cited

U.S. PATENT DOCUMENTS

2008/0212700 A1    9/2008   Han et al.
2010/0091743 A1*   4/2010   Kazmi ................ H04B 7/0689
                                                                370/336
(Continued)

FOREIGN PATENT DOCUMENTS

CN    101582712 A    11/2009
CN    101807981 A    8/2010
(Continued)

*Primary Examiner* — Tanmay K Shah
(74) *Attorney, Agent, or Firm* — Kilpatrick Townsend & Stockton, LLP

(57) ABSTRACT

Disclosed by the present invention are a method, a network side device and a terminal for indicating a pilot precoding mode, wherein the method comprises: The network side device assigns at least one group of pilots to the terminal, wherein each group of pilots comprises at least one pilot. The network side device determines pilot precoding indication information for the at least one group of pilots, wherein the pilot precoding indication information is used to characterize whether each pilot in each group of pilots uses the same precoding matrix. The network side device sends the at least one group of pilots and the pilot precoding indication information to the terminal. The present invention may solve the technical problem not disclosed in prior art of a solution for how a base station or a terminal specifically indicates a pilot precoding mode, so as to improve the control efficiency of a network side device.

14 Claims, 8 Drawing Sheets

(51) Int. Cl.
*H04B 7/06* (2006.01)
*H04L 5/00* (2006.01)

(58) Field of Classification Search
CPC ... H04L 5/0091; H04L 5/0094; H04L 5/0055; H04L 5/0048; H04L 5/0053
USPC ........................................................ 375/267
See application file for complete search history.

(56) References Cited

U.S. PATENT DOCUMENTS

2015/0382268 A1* 12/2015 Hampel ............ H04W 36/0072
455/436
2017/0317795 A1* 11/2017 Wang ................... H04W 24/10

FOREIGN PATENT DOCUMENTS

| | | |
|---|---|---|
| CN | 102111246 A | 6/2011 |
| CN | 105245310 A | 1/2016 |
| CN | 105391513 A | 3/2016 |
| CN | 105991238 A | 10/2016 |
| CN | 106664127 A | 5/2017 |
| EP | 2498412 A1 | 9/2012 |
| EP | 3035620 A1 | 6/2016 |
| EP | 3226436 A1 | 10/2017 |
| WO | 2011005533 A2 | 1/2011 |
| WO | 2016095134 A1 | 6/2016 |
| WO | 2016115679 A1 | 7/2016 |
| WO | 2017026455 A1 | 2/2017 |

* cited by examiner

| Pilot precoding indication information | User equipment feedback state |
|---|---|
| 0 | User equipment feeds back the pilot index information |
| 1 | User equipment does not feed back the pilot index information |

| Pilot precoding indication information | User equipment feedback state |
|---|---|
| 1 | User equipment feeds back the pilot index information |
| 0 | User equipment does not feed back the pilot index information |

| Feedback channel | User equipment feedback state |
|---|---|
| 0 | User equipment feeds back the pilot index information |
| 1 | User equipment does not feed back the pilot index information |

Fig. 5a

| Feedback channel | User equipment feedback state |
|---|---|
| 1 | User equipment feeds back the pilot index information |
| 0 | User equipment does not feed back the pilot index information |

Fig. 5b

METHOD, NETWORK SIDE DEVICE AND TERMINAL FOR INDICATING PILOT PRECODING MODE

The present application is a US National Stage of International Application No. PCT/CN2018/083112, filed Apr. 13, 2018, which claims priority to Chinese Patent Application No. 201710459281.0, filed with the Chinese Patent Office on Jun. 16, 2017 and entitled "Method, Network Side Device and User Equipment for Indicating Pilot Precoding Mode", which is hereby incorporated by reference in its entirety.

FIELD

The invention relates to the field of communication technologies, and particularly to a method, a network side device and a user equipment for indicating a pilot precoding mode.

BACKGROUND

In the multi-beam antenna system, in order to ensure that the base station transmits the pilot signal through the better precoding matrix and the user equipment receives the pilot signal using the better precoding matrix, the user equipment needs to train the transmitting beams of the base station and the receiving beams of the user equipment.

In the process of training the transmitting beams of the base station, the base station pre-codes a plurality of downlink pilots using different precoding matrices and then transmits them. The user equipment measures the plurality of downlink pilots transmitted by the base station, determines the best pilot according to the quality of the received signals, and feeds back the index of the best pilot to the base station. Further, the base station transmits the pilot signals using the best precoding matrix corresponding to the best pilot.

In the process of training the receiving beams of the user equipment, the base station transmits one or more downlink pilots, and in the case of transmitting a plurality of downlink pilots, the base station performs the precoding using the same precoding matrix. The user equipment receives the downlink pilots using different receiving precoding matrices and determines the best receiving precoding matrix according to the quality of the received signals. Further, the user equipment receives the pilot signals through the best receiving precoding matrix. In the process of training the receiving beams of the user equipment, there is no need for the user equipment to feed back any information to the base station.

In the prior art, either in the process of training the transmitting beams of the base station or in the process of training the receiving beams of the user equipment, the base station may configure one or more groups of downlink pilots for the user equipment, where each group of pilots contains a plurality of pilots, and the base station may further configure one or more feedback configurations (or feedback channels).

As can be seen, the solution as to how the base station or user equipment indicates the pilot precoding mode is not disclosed in the prior art.

SUMMARY

The embodiments of the invention provides a method, a network side device and a user equipment for indicating a pilot precoding mode, so as to solve the technical problem that the solution as to how the base station or user equipment specifically indicates the pilot precoding mode is not disclosed in the prior art. The embodiments of the invention disclose the solution as to how the base station or user equipment indicates the pilot precoding mode, facilitate the network side device to control the receiving beam scanning of the user equipment and perform the transmitting beam scanning of the base station, and improve the control efficiency of the network side device.

In one aspect, an embodiment of the present application provides a method of indicating a pilot precoding mode, which includes:

configuring, by a network side device, at least one group of pilots for a user equipment, wherein each group of pilots includes at least one pilot;

determining, by the network side device, pilot precoding indication information of the at least one group of pilots, wherein the pilot precoding indication information indicates whether the least one pilot in the each group of pilots uses a same precoding matrix;

transmitting, by the network side device, the at least one group of pilots and the pilot precoding indication information to the user equipment.

In one embodiment, after the network side device transmits the at least one group of pilots and the pilot precoding indication information to the user equipment, the method further includes:

receiving, by the network side device, feedback information of the user equipment through at least one feedback channel, wherein the at least one feedback channel is configured by the network side device for the user equipment and corresponds to the at least one group of pilots.

In one embodiment, when the network side device configures one group of pilots for the user equipment and the one group of pilots corresponds to one feedback channel, the method further includes:

transmitting, by the network side device, the one group of pilots and pilot precoding indication information corresponding to the one group of pilots to the user equipment;
receiving, by the network side device, the feedback information of the user equipment through the one feedback channel.

In one embodiment, when the network side device configures a plurality of groups of pilots for the user equipment and each group of pilots corresponds to a same feedback channel, the method further includes:

transmitting, by the network side device, each of the plurality of groups of pilots and pilot precoding indication information corresponding to the each group of pilots to the user equipment successively;
receiving, by the network side device, the feedback information of the user equipment through the same feedback channel successively.

In one embodiment, when the network side device configures a plurality of groups of pilots for the user equipment and each group of pilots corresponds to a plurality of feedback channels, the method further includes:

transmitting, by the network side device, any of the plurality of groups of pilots, and indicating the user equipment to feed back the feedback information using any of a plurality of feedback channels corresponding to the any group of pilots, wherein the plurality of feedback channels correspond to different pilot precoding indication information, and the feedback information is pilot index information.

In another aspect, an embodiment of the present application further provides a method of indicating a pilot precoding mode, which includes:

receiving, by a user equipment, at least one group of pilots and pilot precoding indication information transmitted by a network side device, wherein each group of pilots includes at least one pilot, and the pilot precoding indication information indicates whether the at least one pilot in the at least one group of pilots uses a same precoding matrix;

determining, by the user equipment, whether to feedback pilot index information to the network side device based on the pilot precoding indication information.

In one embodiment, after the user equipment determines whether to feed back the pilot index information to the network side device based on the pilot precoding indication information, the method further includes:

if so, feeding back, by the user equipment, the pilot index information to the network side device through at least one feedback channel, wherein the at least one feedback channel is configured by the network side device for the user equipment and corresponds to the at least one group of pilots.

In one embodiment, when the network side device configures one group of pilots for the user equipment and the one group of pilots corresponds to one feedback channel, the method further includes:

receiving, by the user equipment, the one group of pilots and pilot precoding indication information corresponding to the one group of pilots;

feeding back, by the user equipment, the pilot index information to the network side device through the one feedback channel when the user equipment determines to feed back the pilot index information.

In one embodiment, when the network side device configures a plurality of groups of pilots for the user equipment and each group of pilots corresponds to a same feedback channel, the method further includes:

receiving, by the user equipment, each of the plurality of groups of pilots and pilot precoding indication information corresponding to the each group of pilots successively;

feeding back, by the user equipment, the pilot index information through the same feedback channel successively when the user equipment determines to feed back the pilot index information.

In one embodiment, when the network side device configures a plurality of groups of pilots for the user equipment and each group of pilots corresponds to a plurality of feedback channels, the method further includes:

receiving, by the user equipment, any of the plurality of groups of pilots, and feeding back the pilot index information using any of the plurality of feedback channels corresponding to the any group of pilots indicated by the network side device, wherein the plurality of feedback channels correspond to the different pilot precoding indication information.

In another aspect, an embodiment of the present application further provides a network side device, which includes:

a first configuration unit configured to configure at least one group of pilots for a user equipment, wherein each group of pilots includes at least one pilot;

a first determining unit configured to determine pilot precoding indication information of the at least one group of pilots, wherein the pilot precoding indication information indicates whether the at least one pilot in the each group of pilots uses a same precoding matrix;

a first transmitting unit configured to transmit the at least one group of pilots and the pilot precoding indication information to the user equipment.

In another aspect, an embodiment of the present application further provides a user equipment, which includes:

a first receiving unit configured to receive at least one group of pilots and pilot precoding indication information transmitted by a network side device, wherein each group of pilots includes at least one pilot, and the pilot precoding indication information indicates whether the least one pilot in the at least one group of pilots uses a same precoding matrix;

a second determining unit configured to determine whether to feedback pilot index information to the network side device based on the pilot precoding indication information.

In another aspect, an embodiment of the present application further provides a computer device including a memory, a processor and a computer program that is stored on the memory and executable on the processor, wherein the processor performs the steps of the method of indicating the pilot precoding mode described above when executing the computer program.

In another aspect, an embodiment of the present application further provides a computer readable storage medium storing a computer program thereon, where the computer program, when executed by a processor, performs the steps of the method of indicating the pilot precoding mode described above.

The one or more above-mentioned technical solutions in the embodiments of the present application have at least one or more technical effects as follows.

In the technical solution of the embodiments of the present application, the network side device configures at least one group of pilots for the user equipment, wherein each group of pilots includes at least one pilot; the network side device determines the pilot precoding indication information of the at least one group of pilots, wherein the pilot precoding indication information indicates whether the pilots in the each group of pilots use the same precoding matrix; and the network side device transmits the at least one group of pilots and the pilot precoding indication information to the user equipment. That is, the network side device transmits the pilot precoding indication information indicating whether at least one pilot in each of the at least one group of pilots uses the same precoding matrix to the user equipment directly. Further, according to the pilot precoding indication information, the user equipment can determine whether to feed back the pilot index information to the network side device, and it is clear that the network side device indicates the pilot precoding mode, the transmitting beams of the base station are scanned when the user equipment feeds back the pilot index information, the user equipment performs the receiving beam scanning when the user equipment does not feedback the pilot index information. Further, after it is clear that the network side device indicates the pilot precoding mode, the user equipment may facilitate the network side device to control the receiving beam scanning of the user equipment and perform the transmitting beam scanning of the base station, improving the control efficiency of the network.

BRIEF DESCRIPTION OF THE DRAWINGS

In order to illustrate the technical solutions in the embodiments of the present application or in the prior art more clearly, the accompanying figures which need to be used in describing the embodiments will be introduced below briefly. Obviously the accompanying figures described below are only some embodiments of the invention.

FIGS. 5a-5b are the correspondences between two feedback channels and the user equipment feedback states in the third implementation when 1 bit is used to indicate two feedback channels in indicating the pilot precoding mode in accordance with the first embodiment of the present application;

DETAILED DESCRIPTION

Figure 1:
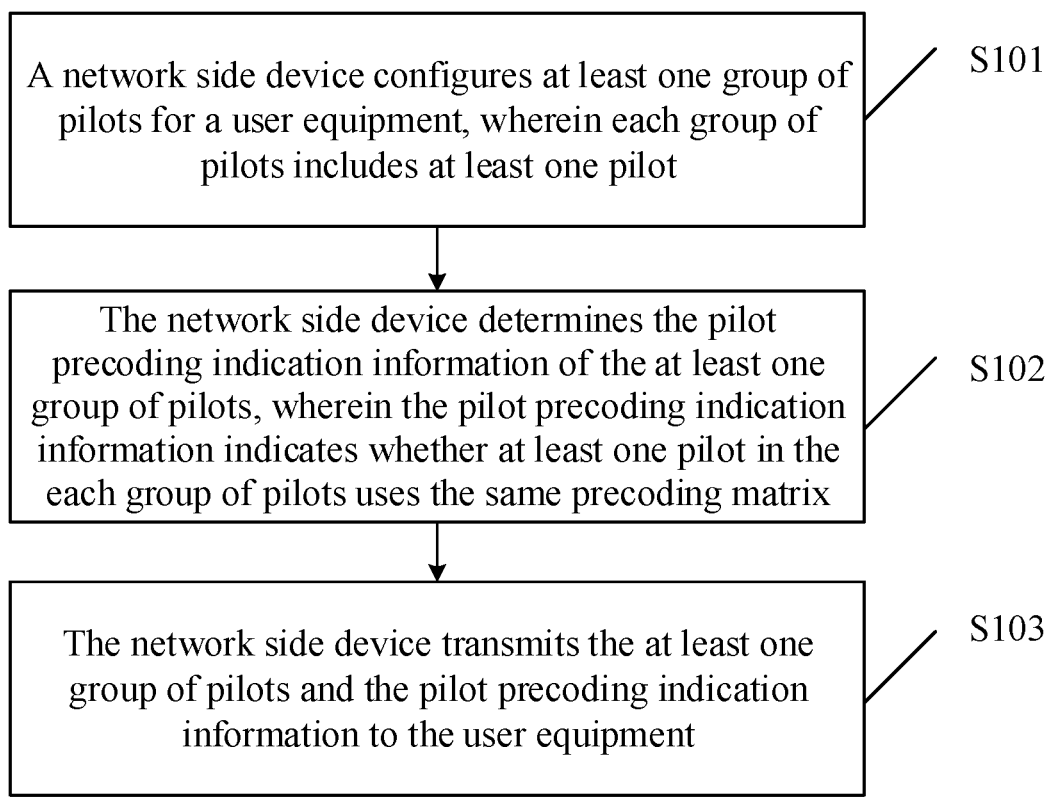
FIG. 1 is a flow chart of a method of indicating a pilot precoding mode in accordance with a first embodiment of the present application.

In order to make the objects, technical solutions and advantages of the invention clearer, the technical solutions in the embodiments of the invention will be described clearly and completely below in combination with the accompanying drawings in the embodiments of the invention. Obviously the described embodiments are a part of the embodiments of the invention but not all the embodiments. Based upon the embodiments of the invention, all of other embodiments obtained by those ordinary skilled in the art without creative work pertain to the protection scope of the invention.

It should be understood that the technical solutions of the invention can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, Universal Mobile Telecommunication System (UMTS), New Radio (NR) and the like.

It should be further understood that the User Equipment (UE) includes but not limited to a Mobile Station (MS), a mobile terminal, a mobile telephone, a handset, a portable equipment or the like in the embodiments of the invention. This user equipment can communicate with one or more core networks via the Radio Access Network (RAN), for example, the user equipment can be a mobile telephone (or called "cellular" telephone), a computer with the wireless communication function, or the like. The user equipment can also be a portable, pocket, handheld, computer built-in or vehicle-carried mobile device.

In the embodiments of the invention, the base station (e.g., access point) can mean the device in the access network communicating with the wireless user equipment via one or more sectors over the air interface. The base station can be used to perform the interconversion between the received air frame and the IP packet, and used as the router between the wireless user equipment and the rest of the access network, wherein the rest of the access network may include Internet Protocol (IP) networks. The base station can further coordinate the attribute management of the air interface. For example, the base station can be the Base Transceiver Station (BTS) in the GSM or CDMA, or can be the NodeB in the TD-SCDMA or WCDMA, or can be the evolutional Node B (eNodeB or eNB or e-NodeB) in the LTE, or can be the gNB in the 5G NR, which is not limited in the invention.

The embodiments of the invention provides a method, a network side device and a user equipment for indicating a pilot precoding mode, so as to solve the technical problem that the solution as to how the base station or user equipment specifically indicates the pilot precoding mode is not disclosed in the prior art. The embodiments of the invention disclose the solution as to how the base station or user equipment indicates the pilot precoding mode, facilitate the network side device to control the receiving beam scanning of the user equipment and perform the transmitting beam scanning of the base station, and improve the control efficiency of the network side device.

In order to solve the above-mentioned technical problem, the general idea of the technical solution in the embodiments of the present application is as follows.

A method of indicating a pilot precoding mode includes:
a network side device configures at least one group of pilots for a user equipment, wherein each group of pilots includes at least one pilot;
the network side device determines the pilot precoding indication information of the at least one group of pilots, wherein the pilot precoding indication information is used to characterize whether each pilot in the each group of pilots uses the same precoding matrix;
the network side device transmits the at least one group of pilots and the pilot precoding indication information to the user equipment.

In the technical solution of the embodiments of the present application, the network side device configures at least one group of pilots for the user equipment, wherein each group of pilots includes at least one pilot; the network side device determines the pilot precoding indication information of the at least one group of pilots, wherein the pilot precoding indication information indicates whether the at least one pilot in the each group of pilots uses the same precoding matrix; and the network side device transmits the at least one group of pilots and the pilot precoding indication information to the user equipment. That is, the network side device transmits the pilot precoding indication information indicating whether the at least one pilot in each of the at least one group of pilots uses the same precoding matrix to the user equipment directly. Further, according to the pilot precoding indication information, the user equipment can determine whether to feed back the pilot index information to the network side device, and it is clear that the network side device indicates the pilot precoding mode. Since the transmitting beam of the base station are scanned when the user equipment feeds back the pilot index information, the user equipment performs the receiving beam scanning when the user equipment does not feedback the pilot index information. Further, after it is determined that the network side device indicates the pilot precoding mode, the user equipment may facilitate the network side device to control the receiving beam scanning of the user equipment and perform the transmitting beam scanning of the base station, improving the control efficiency of the network.

In the embodiments of the present application, the network side device can specifically be one or more base stations. The user equipment can specifically be a smart phone, a laptop computer, a tablet computer, a desktop computer, or other devices, which will not be illustrated here one by one.

In order for the better understanding of the above-mentioned technical solutions, the technical solutions of the invention will be illustrated below in details by way of the drawings and specific embodiments, and it should be understood that the embodiments of the present application and the specific features in the embodiments are intended to illustrate the technical solutions of the invention in details but not limit the technical solutions of the invention, and the embodiments of the present application and the specific features in the embodiments can be combined with each other without collision.

First Embodiment

Referring to FIG. 1, the first embodiment of the present application provides a method of indicating a pilot precoding mode, which includes the following steps.

S101: a network side device configures at least one group of pilots for a user equipment, wherein each group of pilots includes at least one pilot.

S102: the network side device determines the pilot precoding indication information of the at least one group of pilots, wherein the pilot precoding indication information indicates whether the at least one pilot in the each group of pilots uses the same precoding matrix.

S103: the network side device transmits the at least one group of pilots and the pilot precoding indication information to the user equipment.

In a specific implementation process, the specific implementation process of the steps S101-S103 is as follows.

At first, the network side device configures at least one group of pilots for the user equipment, wherein each group of pilots includes at least one pilot. That is, the network side device preconfigures at least one group of pilots for the user equipment, e.g., preconfigures the pilot groups A, B and C, wherein the pilot group A includes four pilots: pilot a, pilot b, pilot c and pilot d. Then the network side device determines the pilot precoding indication information of the at least one group of pilots, wherein the pilot precoding indication information indicates whether the pilot(s) in the each group of pilots use the same precoding matrix. For example, the network side device uses 1 bit (0 or 1) to indicate whether the at least one pilot in the pilot group uses the same precoding matrix. That is, the network side device indicates the pilot precoding mode of the at least one group of pilots explicitly. Then the network side device transmits the at least one group of pilots and the pilot precoding indication information to the user equipment. In a specific implementation process, the user equipment can further determine whether the user equipment feeds back the pilot index to the network side device after parsing the precoding indication information. In a specific implementation process, the transmitting beam of the base station are scanned when the user equipment feeds back the pilot index information; the user equipment performs the receiving beam scanning when the user equipment does not feedback the pilot index information. Further, after it is determined that the network side device indicates the pilot precoding mode, the user equipment may facilitate the network side device to control the receiving beam scanning of the user equipment and perform the transmitting beam scanning of the base station, improving the control efficiency of the network.

In an embodiment of the present application, in order to further ensure that the network side device uses the beam-trained pilots to transmit the network data such as voice data, after the step S103 in which the network side device transmits the at least one group of pilots and the pilot precoding indication information to the user equipment, the method further includes:

the network side device receives the feedback information of the user equipment through at least one feedback channel, wherein the at least one feedback channel is configured by the network side device for the user equipment and corresponds to the at least one group of pilots.

In a specific implementation process, the network side device receives the feedback information of the user equipment through at least one feedback channel preconfigured for the user equipment and parses the feedback information. The at least one feedback channel corresponds to the at least one group of pilots. Specifically, one group of pilots can correspond to one feedback channel; or multiple groups of pilots can correspond to one feedback channel, for example, three groups of pilots correspond to one feedback channel; or multiple groups of pilots can correspond to a plurality of feedback channels, for example, three groups of pilots correspond to three feedback channels; and so on, which will not be illustrated one by one.

Then the network side device parses the feedback information and determines whether the feedback information includes the pilot index information. When the feedback information includes the pilot index information, the network side device further determines some specific pilot in the pilot group corresponding to the pilot index information. For example, the pilot index information corresponds to the pilot a in the pilot group A, then when the network side device transmits the data subsequently, the network side device transmits the network data using the pilot a as in the above example. In another example, after the network side device performs the transmitting beam training, it determines that the pilot with the best quality of received signal of the user equipment as the pilot a, that is, when the network side device transmits the network data to the user equipment using the pilot a, the signal received by the user equipment has the best quality. The pilot index information corresponding to the pilot a is further determined. In this case, the network side device subsequently transmits the network data using the pilot a, which ensures that the quality of the signal received by the user equipment is better.

Furthermore, when the feedback information does not include the pilot index information, it indicates that each pilot in the pilot group transmitted by the network side device to the user equipment uses the same precoding matrix. In this way, the user equipment performs the transmitting beam training, and after training, the user equipment determines the pilot with the best quality of the received signal of the user equipment. Then the user equipment receives the network data transmitted from the network side device using this pilot, to further ensure the quality of the network data received by the user equipment.

In an embodiment of the present application, the at least one group of pilots can specifically be one group of pilots, or can be multiple groups of pilots. The at least one feedback channel can be one feedback channel, or can be a plurality of feedback channels. For different configuration cases of the network side device for the user equipment, there are several implementations of indicating the pilot precoding mode, and accordingly there are also several cases of transmitting the pilot group and the pilot precoding indication information by the network side device, but not limited to the following implementations.

First Implementation

Figures 2, 3A:
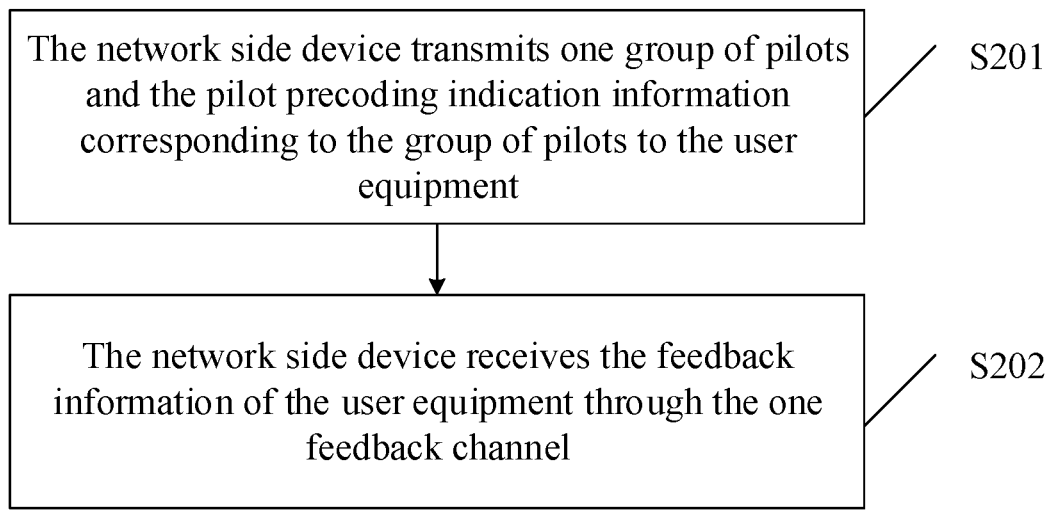
FIG. 2 is a flow chart of a first implementation in which the network side device indicates the pilot precoding information in indicating the pilot precoding mode in accordance with the first embodiment of the present application.
FIGS. 3a-3b are the correspondences between the pilot precoding indication information and the user equipment feedback states in the first and second implementations when 1 bit is used to indicate the pilot precoding indication information in a method of indicating the pilot precoding mode in accordance with the first embodiment of the present application.

In an embodiment of the present application, as shown in FIG. 2, the first implementation is as follows: when the network side device configures a group of pilots for the user equipment and the group of pilots corresponds to one feedback channel, the method further includes the following steps.

S201: the network side device transmits one group of pilots and the pilot precoding indication information corresponding to the group of pilots to the user equipment.

S202: the network side device receives the feedback information of the user equipment through the one feedback channel.

In a specific implementation, the specific implementation process of the steps S201-S202 is as follows.

At first, the network side device preconfigures a group of pilots for the user equipment and the group of pilots corresponds to one feedback channel. In this way, the network side device transmits the group of pilots and the precoding indication information corresponding to the group of pilots to the user equipment, and then the user equipment parses the received precoding indication information and determines whether the user equipment needs to feed back the pilot index information to the network side device. In a specific implementation process, the network side device receives the feedback information fed back by the user equipment through the feedback channel, and parses the feedback information. When the feedback information includes the pilot index information, the network side device receives the pilot index information through the feedback channel. When the user equipment does not feedback the pilot information, the feedback information is other information than the pilot index information.

Figures 3B, 4:
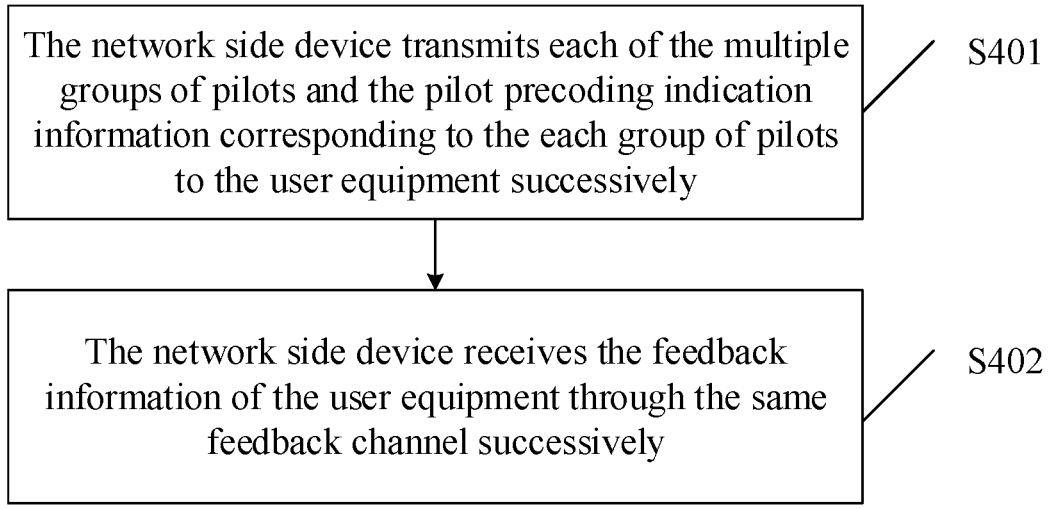
FIG. 4 is a method flow chart of a second implementation in which the network side device indicates the pilot precoding information in indicating the pilot precoding mode in accordance with the first embodiment of the present application.

Specifically, the network side device determines whether the feedback information includes the pilot index information, if so, the network side device transmits the network data using the precoding matrix corresponding to the pilot index information. If not, the user equipment does not transmit the pilot index information to the network side device. For example, when the pilot precoding indication information is indicated using 1 bit, the correspondence between the pilot precoding indication information and the user equipment feedback states in the first implementation is as shown in FIG. 3*a* or 3*b*. With the correspondence shown in FIG. 3*a*, when the indication bit obtained after the user equipment parses the pilot precoding indication information is "0", it indicates that the feedback state of the user equipment is to feed back the pilot index information to the network side device. With the correspondence shown in FIG. 3*b*, when the indication bit obtained after the user equipment parses the pilot precoding indication information is "0", it indicates that the feedback state of the user equipment is not to feed back the pilot index information to the network side device. Of course, those skilled in the art can also design the specific form of the pilot precoding indication information according to the specific requirements, which will not be illustrated here one by one.

Second Implementation

In an embodiment of the present application, referring to FIG. 4, the second implementation is as follows: when the network side device configures multiple groups of pilots for the user equipment and each group of pilots corresponds to the same feedback channel, the method further includes the following steps.

S401: the network side device transmits each of the multiple groups of pilots and the pilot precoding indication information corresponding to the each group of pilots to the user equipment successively.

S402: the network side device receives the feedback information of the user equipment through the same feedback channel successively.

In a specific implementation process, the specific implementation process of the steps S401-S402 is as follows.

At first, the network side device preconfigures multiple groups of pilots for the user equipment and each group of pilots corresponds to the same feedback channel. The network side device transmits each of the multiple groups of pilots and the pilot precoding indication information corresponding to the each group of pilots to the user equipment successively. That is, in the second case, the network side device transmits only one pilot group together with the pilot precoding indication information corresponding to the pilot group at a time. That is, the network side device transmits the information set including each of the multiple groups of pilots and the pilot precoding indication information corresponding to the each group of pilots to the user equipment successively, wherein the information set includes each group of pilots and the pilot precoding indication information corresponding to the each group of pilots. The user equipment parses the pilot precoding indication information and determines the feedback state of the user equipment, for example, the feedback state is the state as to whether the user equipment needs to feeds back the pilot index to the network side. For example, when the pilot precoding indication information is indicated using 1 bit, the correspondence between the pilot precoding indication information and the user equipment feedback states in the second implementation is still as shown in FIG. 3*a* or 3*b*. Of course, those skilled in the art can also design the specific form of the pilot precoding indication information according to the specific requirements, which will not be illustrated here one by one.

Third Implementation

In an embodiment of the present application, the third implementation is as follows: when the network side device configures multiple groups of pilots for the user equipment and each group of pilots corresponds to a plurality of feedback channels, the method further includes: the network side device transmits any of the multiple groups of pilots, and indicates the user equipment to feed back the feedback information using any of a plurality of feedback channels corresponding to the any group of pilots. The plurality of feedback channels correspond to the different pilot precoding indication information, and the feedback information is the pilot index information. That is, the network side device preconfigures the feedback channels for the user equipment, and directly informs the user equipment which feedback channel is used for the information feedback. Here the plurality of feedback channels correspond to the different pilot precoding indication information respectively. Take two feedback channels for example, when the two feedback channels are indicated using 1 bit, the correspondence between the two feedback channels and the user equipment feedback states in the third implementation is as shown in FIG. 5a or 5b. With the correspondence shown in FIG. 5a, when the user equipment uses the feedback channel with the indication bit "0" to feed back the pilot index information, the feedback state of the user equipment is to feed back the pilot index information to the network side device. With the correspondence shown in FIG. 5b, when the user equipment uses the feedback channel with indication bit "0" to feed back the pilot index information, the feedback state of the user equipment is not to feed back the pilot index information to the network side device. Of course, those skilled in the art can also design the specific form of the pilot precoding indication information according to the specific requirements, which will not be illustrated here one by one.

Second Embodiment

Figure 6:
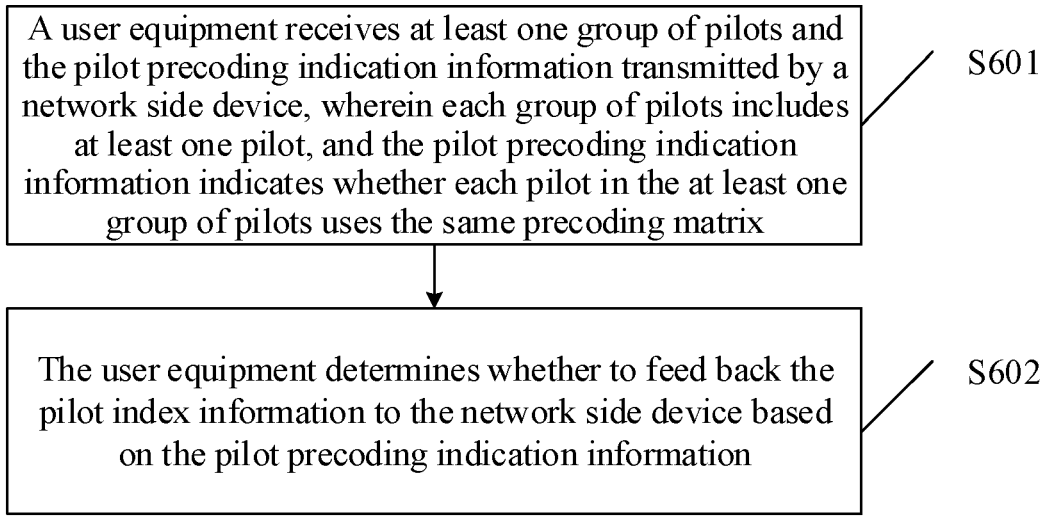
FIG. 6 is a flow chart of a method of indicating a pilot precoding mode in accordance with a second embodiment of the present application.

Based upon the same inventive concept as the first embodiment of the present application, referring to FIG. 6, the second embodiment of the present application further provides a method of indicating a pilot precoding mode, which includes the following steps.

S601: a user equipment receives at least one group of pilots and the pilot precoding indication information transmitted by a network side device, wherein each group of pilots includes at least one pilot, and the pilot precoding indication information indicates whether the at least one pilot in the at least one group of pilots uses the same precoding matrix.

S602: the user equipment determines whether to feed back the pilot index information to the network side device based on the pilot precoding indication information.

The specific implementation processes of the steps S601-S602 have been described in details in the first embodiment, and the detailed description thereof will be omitted here.

In an embodiment of the present application, after the step S602 in which the user equipment determines whether to feed back the pilot index information to the network side device based on the pilot precoding indication information, the method further includes: if so, the user equipment feeds back the pilot index information to the network side device through at least one feedback channel, wherein the at least one feedback channel is configured by the network side device for the user equipment and corresponds to the at least one group of pilots. The specific implementation principle is the same as that in the first embodiment, and the detailed description thereof will be omitted here.

In an embodiment of the present application, for the specific case in which the network side device configures the pilot groups and the feedback channels for the user equipment, the case in which the user equipment receives the precoding indication information and the pilot index information can have the following implementations, but not limited to three following implementations.

First Implementation

Figure 7:
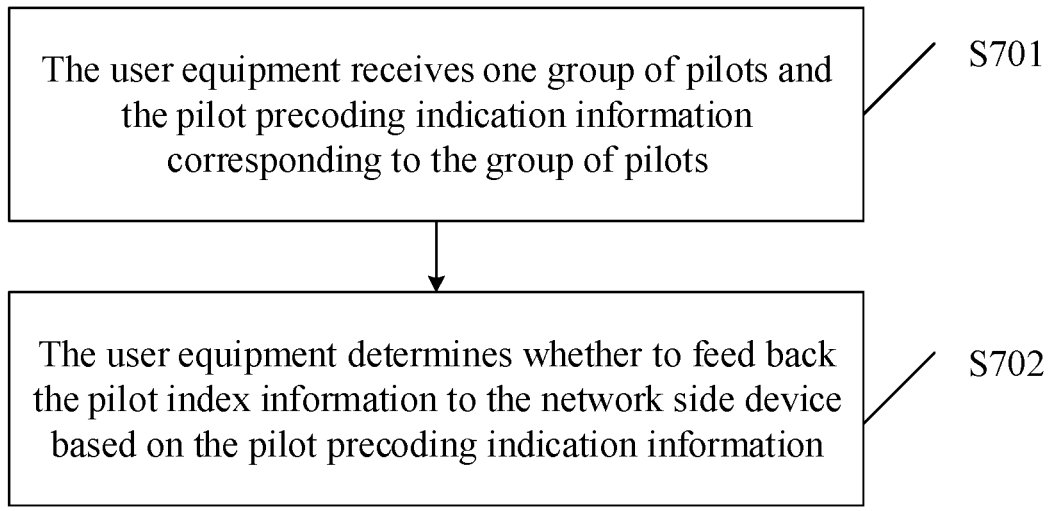
FIG. 7 is a method flow chart of a first implementation in which the user equipment indicates the pilot precoding information in indicating the pilot precoding mode in accordance with the second embodiment of the present application.

In an embodiment of the present application, referring to FIG. 7, when the network side device configures one group of pilots for the user equipment and the one group of pilots corresponds to one feedback channel, the method further includes the following steps.

S701: the user equipment receives the one group of pilots and the pilot precoding indication information corresponding to the one group of pilots.

S702: the user equipment feeds back the pilot index information to the network side device through the one feedback channel when the user equipment determines to feed back the pilot index information.

In a specific implementation process, the specific implementation processes of the steps S701-S702 have been described in details in the first embodiment, and the detailed description thereof will be omitted here.

Second Implementation

Figure 8:
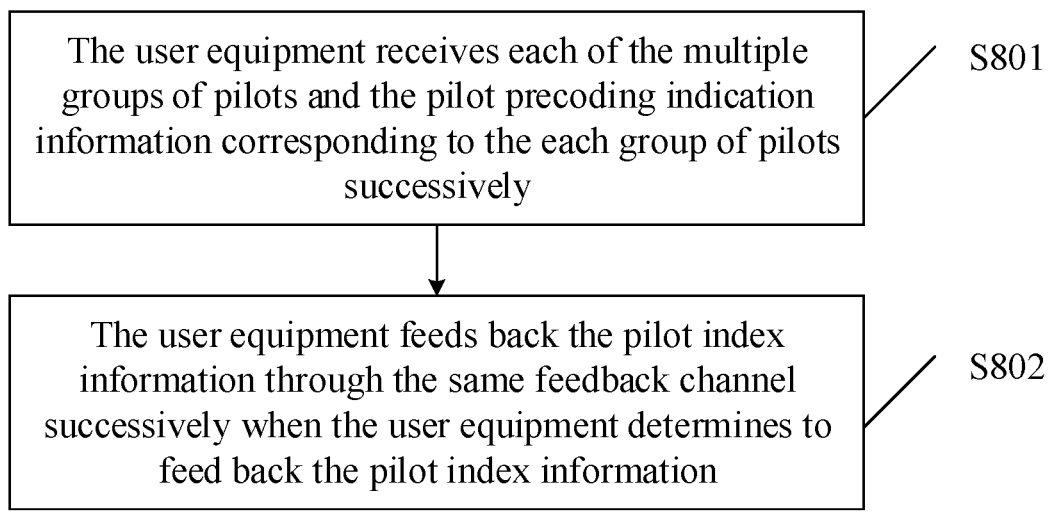
FIG. 8 is a method flow chart of a second implementation in which the user equipment indicates the pilot precoding information in indicating the pilot precoding mode in accordance with the second embodiment of the present application.

In an embodiment of the present application, referring to FIG. 8, when the network side device configures multiple groups of pilots for the user equipment and each group of pilots corresponds to the same feedback channel, the method further includes the following steps.

S801: the user equipment receives each of the multiple groups of pilots and the pilot precoding indication information corresponding to the each group of pilots successively.

S802: the user equipment feeds back the pilot index information through the same feedback channel successively when the user equipment determines to feed back the pilot index information.

Third Implementation

When the network side device configures multiple groups of pilots for the user equipment and each group of pilots corresponds to a plurality of feedback channels, the method further includes: the user equipment receives any of the multiple groups of pilots, and feeds back the pilot index information using any of the plurality of feedback channels corresponding to the any group of pilots indicated by the network side device, wherein the plurality of feedback channels correspond to the different pilot precoding indication information. For the three implementations described above, the specific implementation principles are the same as those in the first embodiment, and the detailed description thereof will be omitted here.

Third Embodiment

Figure 9:
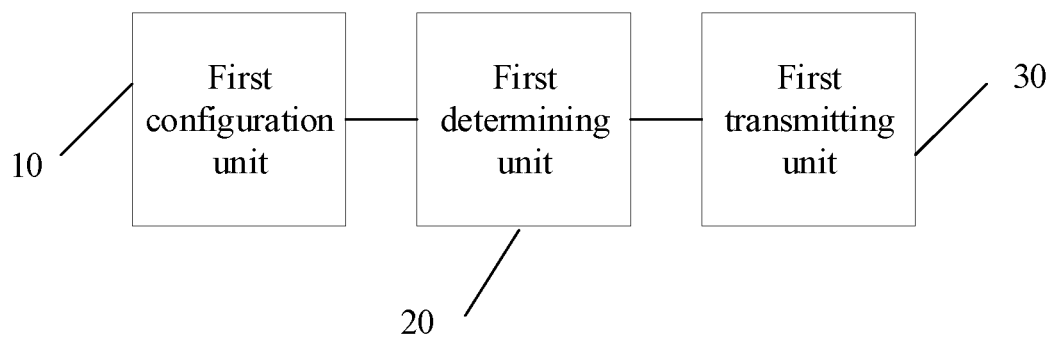
FIG. 9 is a network side device in accordance with a third embodiment of the present application.

Based upon the same inventive concept as the first embodiment of the present application, referring to FIG. 9, the third embodiment of the present application further provides a network side device, which includes:

a first configuration unit 10 configured to configure at least one group of pilots for a user equipment, wherein each group of pilots includes at least one pilot;

a first determining unit 20 configured to determine the pilot precoding indication information of the at least one group of pilots, wherein the pilot precoding indication information indicates whether the at least one pilot in the each group of pilots uses the same precoding matrix;

a first transmitting unit 30 configured to transmit the at least one group of pilots and the pilot precoding indication information to the user equipment.

In an embodiment of the present application, after the network side device transmits the at least one group of pilots and the pilot precoding indication information to the user equipment, the network side device further includes:

a receiving unit configured to receive the feedback information of the user equipment through at least one feedback channel, wherein the at least one feedback channel is configured by the network side device for the user equipment and corresponds to the at least one group of pilots.

In an embodiment of the present application, when the network side device configures one group of pilots for the user equipment and the one group of pilots corresponds to one feedback channel, the first transmitting unit 30 is configured to transmit the one group of pilots and the pilot precoding indication information corresponding to the one group of pilots to the user equipment; and the receiving unit is configured to receive the feedback information of the user equipment through the one feedback channel.

In an embodiment of the present application, when the network side device configures multiple groups of pilots for the user equipment and the multiple groups of pilots correspond to the same feedback channel, the first transmitting unit 30 is configured to transmit each of the multiple groups of pilots and the pilot precoding indication information corresponding to the each group of pilots to the user equipment successively; and the receiving unit is configured to receive the feedback information of the user equipment through the same feedback channel successively.

In an embodiment of the present application, when the network side device configures multiple groups of pilots for the user equipment and each group of pilots corresponds to a plurality of feedback channels, the first transmitting unit 30 is configured to transmit any of the multiple groups of pilots, and indicate the user equipment to feed back the feedback information using any of a plurality of feedback channels corresponding to the any group of pilots, wherein the plurality of feedback channels correspond to the different pilot precoding indication information, and the feedback information is the pilot index information.

Fourth Embodiment

Figure 10:
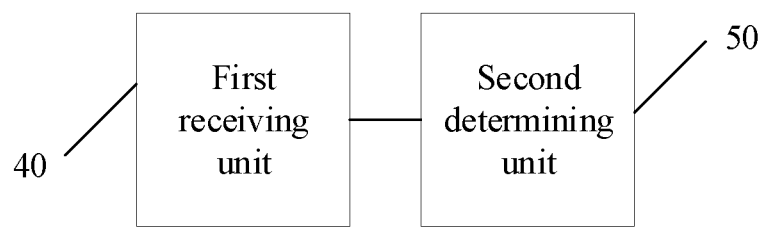
FIG. 10 is a user equipment in accordance with a fourth embodiment of the present application.

Based upon the same inventive concept as the first embodiment of the present application, referring to FIG. 10, the fourth embodiment of the present application further provides a user equipment, which includes:

a first receiving unit 40 configured to receive at least one group of pilots and pilot precoding indication information transmitted by a network side device, wherein each group of pilots includes at least one pilot, and the pilot precoding indication information indicates whether each pilot in the at least one group of pilots uses a same precoding matrix;

a second determining unit 50 configured to determine whether to feed back the pilot index information to the network side device based on the pilot precoding indication information.

In an embodiment of the present application, after the user equipment determines whether to feed back the pilot index information to the network side device based on the pilot precoding indication information, if so, the user equipment further includes:

a first feedback unit configured to feed back the pilot index information to the network side device through at least one feedback channel, wherein the at least one feedback channel is configured by the network side device for the user equipment and corresponds to the at least one group of pilots.

In an embodiment of the present application, when the network side device configures one group of pilots for the user equipment and the one group of pilots corresponds to one feedback channel, the first receiving unit 40 is configured to receive the one group of pilots and the pilot precoding indication information corresponding to the one group of pilots; and the first feedback unit is configured to feed back the pilot index information to the network side device through the one feedback channel when the user equipment determines to feed back the pilot index information.

In an embodiment of the present application, when the network side device configures multiple groups of pilots for the user equipment and the multiple groups of pilots correspond to the same feedback channel, the first receiving unit 40 is configured to receive each of the multiple groups of pilots and the pilot precoding indication information corresponding to the each group of pilots successively; and the first feedback unit is configured to feed back the pilot index information through the same feedback channel successively when the user equipment determines to feed back the pilot index information.

In an embodiment of the present application, when the network side device configures multiple groups of pilots for the user equipment and each group of pilots corresponds to a plurality of feedback channels, the first receiving unit 40 is configured to receive any of the multiple groups of pilots, and feedback the pilot index information using any of a plurality of feedback channels corresponding to the any group of pilots indicated by the network side device, wherein the plurality of feedback channels correspond to the different pilot precoding indication information.

Another aspect of an embodiment of the invention provides a computer device. In a specific implementation process, the computer device can specifically be a network side device or a user equipment, and include a memory, a processor and a computer program that is stored on the memory and executable on the processor. The processor performs the methods of all the aspects described above when executing the computer program.

Another aspect of an embodiment of the invention provides a computer readable storage medium storing a computer program thereon, where the computer program, when executed by a processor, performs the methods of all the aspects described above.

Figure 11:
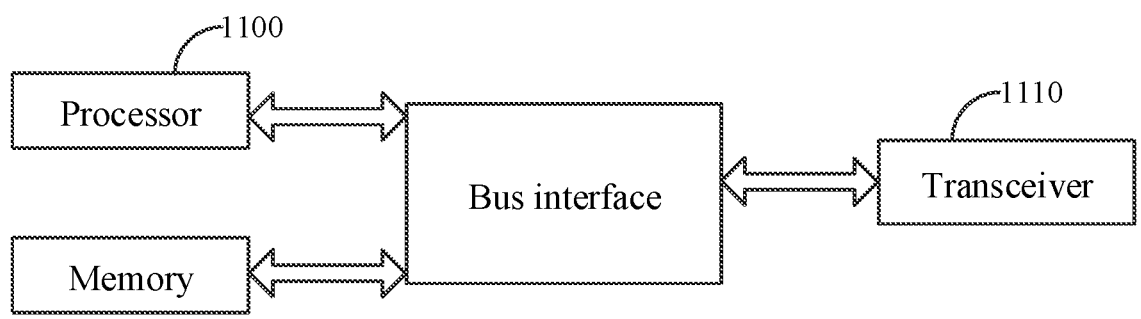
FIG. 11 is another network side device in accordance with an embodiment of the present application.

As shown in FIG. 11, an embodiment of the invention provides a network side device including at least a processor 1100 and a transceiver 1110, wherein:

the processor 1100 is configured to read the programs in a memory to perform the process of:

configuring at least one group of pilots for a user equipment, wherein each group of pilots includes at least one pilot;

determining the pilot precoding indication information of the at least one group of pilots, wherein the pilot precoding indication information indicates whether the at least one pilot in the each group of pilots uses the same precoding matrix;

transmitting the at least one group of pilots and the pilot precoding indication information to the user equipment via the transceiver 1110;

the transceiver 1110 is configured to receive and transmit the data under the control of the processor 1100.

Here, in FIG. 11, the bus architecture can include any numbers of interconnected buses and bridges, and specifically link various circuits of one or more processors represented by the processor 1100 and the memory represented by the memory. The bus architecture can further link various other circuits such as peripheral device, voltage regulator and power management circuit, which are all well known in the art and thus will not be further described again herein. The bus interface provides an interface. The transceiver 1110 can be a plurality of elements, i.e., include a transmitter and a receiver, and provide the units for communicating with various other devices over the transmission media. The processor 1100 is responsible for managing the bus architecture and general processing, and the memory can store the data used by the processor 1100 when performing the operations.

In one embodiment, after the network side device transmits the at least one group of pilots and the pilot precoding indication information to the user equipment, the processor 1100 is further configured to:

receive the feedback information of the user equipment through at least one feedback channel via the transceiver 1110, wherein the at least one feedback channel is configured by the network side device for the user equipment and corresponds to the at least one group of pilots.

In one embodiment, when the network side device configures one group of pilots for the user equipment and the one group of pilots corresponds to one feedback channel, the processor 1100 is further configured to:

transmit the one group of pilots and the pilot precoding indication information corresponding to the one group of pilots to the user equipment via the transceiver 1110;

receive the feedback information of the user equipment through the one feedback channel via the transceiver 1110.

In one embodiment, when the network side device configures multiple groups of pilots for the user equipment and the multiple groups of pilots correspond to the same feedback channel, the processor 1100 is further configured to:

transmit each of the multiple groups of pilots and the pilot precoding indication information corresponding to the each group of pilots to the user equipment successively via the transceiver 1110;

receive the feedback information of the user equipment through the same feedback channel successively via the transceiver 1110.

In one embodiment, when the network side device configures multiple groups of pilots for the user equipment and each group of pilots corresponds to a plurality of feedback channels, the processor 1100 is further configured to:

transmit any of the multiple groups of pilots via the transceiver 1110, and indicate the user equipment to feed back the feedback information using any of a plurality of feedback channels corresponding to the any group of pilots, wherein the plurality of feedback channels correspond to the different pilot precoding indication information, and the feedback information is the pilot index information.

Figure 12:
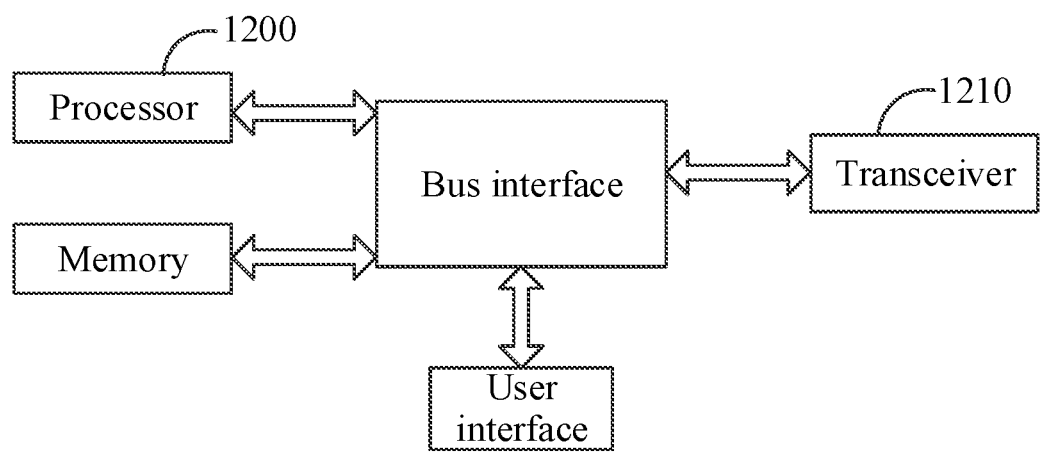
FIG. 12 is another user equipment in accordance with an embodiment of the present application.

As shown in FIG. 12, an embodiment of the invention provides a network side device including at least a processor 1200 and a transceiver 1210, wherein:

the processor 1200 is configured to read the programs in a memory to perform the process of:

receiving at least one group of pilots and the pilot precoding indication information transmitted by a network side device via the transceiver 1210, wherein each group of pilots includes at least one pilot, and the pilot precoding indication information indicates whether the at least one pilot in the at least one group of pilots uses the same precoding matrix; and determining whether to feed back the pilot index information to the network side device based on the pilot precoding indication information;

the transceiver 1210 is configured to receive and transmit the data under the control of the processor 1200.

Here, in FIG. 12, the bus architecture can include any numbers of interconnected buses and bridges, and specifically link various circuits of one or more processors represented by the processor 1200 and the memory represented by the memory. The bus architecture can further link various other circuits such as peripheral device, voltage regulator and power management circuit, which are all well known in the art and thus will not be further described again herein. The bus interface provides an interface. The transceiver 1210 can be a plurality of elements, i.e., include a transmitter and a receiver, and provide the units for communicating with various other devices over the transmission media. For different user equipments, the user interface can also be the interface capable of connecting with the required internal or external devices, and the connected devices include but not limited to keypad, display, loudspeaker, microphone, joystick and the like.

The processor 1200 is responsible for managing the bus architecture and general processing, and the memory can store the data used by the processor 1200 when performing the operations.

In one embodiment, after the user equipment determines whether to feed back the pilot index information to the network side device based on the pilot precoding indication information, the processor 1200 is further configured to:

if so, feedback the pilot index information to the network side device through at least one feedback channel via the transceiver 1210, wherein the at least one feedback channel is configured by the network side device for the user equipment and corresponds to the at least one group of pilots.

In one embodiment, when the network side device configures one group of pilots for the user equipment and the one group of pilots corresponds to one feedback channel, the processor 1200 is further configured to:

receive the one group of pilots and the pilot precoding indication information corresponding to the one group of pilots via the transceiver 1210;

feedback the pilot index information to the network side device through the one feedback channel via the transceiver 1210 when determining to feed back the pilot index information.

In one embodiment, when the network side device configures multiple groups of pilots for the user equipment and the multiple groups of pilots correspond to the same feedback channel, the processor 1200 is further configured to:

receive each of the multiple groups of pilots and the pilot precoding indication information corresponding to the each group of pilots successively via the transceiver 1210;

feedback the pilot index information through the same feedback channel successively via the transceiver 1210 when determining to feed back the pilot index information.

In one embodiment, when the network side device configures multiple groups of pilots for the user equipment and each group of pilots corresponds to a plurality of feedback channels, the processor 1200 is further configured to:

receive any of the multiple groups of pilots via the transceiver 1210, and feedback the pilot index information by using any of a plurality of feedback channels corresponding to the any group of pilots indicated by the network side device, wherein the plurality of feedback channels correspond to the different pilot precoding indication information.

The one or more above-mentioned technical solutions in the embodiments of the present application have at least one or more technical effects as follows.

In the technical solution of the embodiments of the present application, the network side device configures at least one group of pilots for the user equipment, wherein each group of pilots includes at least one pilot; the network side device determines the pilot precoding indication information of the at least one group of pilots, wherein the pilot precoding indication information indicates whether the at least one pilot in the each group of pilots uses the same precoding matrix; and the network side device transmits the at least one group of pilots and the pilot precoding indication information to the user equipment. That is, the network side device transmits the pilot precoding indication information indicating whether the at least one pilot in each of the at least one group of pilots uses the same precoding matrix to the user equipment directly. Further, according to the pilot precoding indication information, the user equipment can determine whether to feed back the pilot index information to the network side device, and it is clear that the network side device indicates the pilot precoding mode. Since the transmitting beams of the base station are scanned when the user equipment feeds back the pilot index information, the user equipment performs the receiving beam scanning when the user equipment does not feedback the pilot index information. Further, after it is determined that the network side device indicates the pilot precoding mode, the user equipment may facilitate the network side device to control the receiving beam scanning of the user equipment and perform the transmitting beam scanning of the base station, improving the control efficiency of the network.

It should be understood by those skilled in the art that the embodiments of the invention can provide methods, systems and computer program products. Thus the invention can take the form of hardware embodiments alone, software embodiments alone, or embodiments combining the software and hardware aspects. Also the invention can take the form of computer program products implemented on one or more computer usable storage mediums (including but not limited to magnetic disk memories, CD-ROMs, optical memories and the like) containing computer usable program codes therein.

The invention is described by reference to the flow charts and/or the block diagrams of the methods, the devices (systems) and the computer program products according to the embodiments of the invention. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the embodiments of the invention have been described, those skilled in the art can make additional alterations and modifications to these embodiments once they learn about the basic creative concepts. Thus the attached claims are intended to be interpreted to include the embodiments as well as all the alterations and modifications falling within the scope of the invention.

Evidently those skilled in the art can make various modifications and variations to the embodiments of the invention without departing from the spirit and scope of the embodiments of the invention. Thus the invention is also intended to encompass these modifications and variations therein as long as these modifications and variations to the embodiments of the invention come into the scope of the claims of the invention and their equivalents.

What is claimed is:

1. A method of indicating a pilot precoding mode, comprising:
configuring, by a network side device, at least one group of pilots for a user equipment, wherein each group of pilots comprises at least one pilot;
determining, by the network side device, pilot precoding indication information of the at least one group of pilots, wherein the pilot precoding indication information indicates whether the at least one pilot in the each group of pilots uses a same precoding matrix; and
transmitting, by the network side device, the at least one group of pilots and the pilot precoding indication information to the user equipment.

2. The method of claim 1, wherein after the network side device transmits the at least one group of pilots and the pilot precoding indication information to the user equipment, the method further comprises:
receiving, by the network side device, feedback information of the user equipment through at least one feedback channel, wherein the at least one feedback channel is configured by the network side device for the user equipment and corresponds to the at least one group of pilots.

3. The method of claim 2, wherein when the network side device configures one group of pilots for the user equipment and the one group of pilots corresponds to one feedback channel, the method further comprises:
transmitting, by the network side device, the one group of pilots and pilot precoding indication information corresponding to the one group of pilots to the user equipment; and
receiving, by the network side device, the feedback information of the user equipment through the one feedback channel.

4. The method of claim 2, wherein when the network side device configures a plurality of groups of pilots for the user equipment and the plurality of groups of pilots correspond to a same feedback channel, the method further comprises:
transmitting, by the network side device, each of the plurality of groups of pilots and pilot precoding indication information corresponding to the each group of pilots to the user equipment successively; and
receiving, by the network side device, the feedback information of the user equipment through the same feedback channel successively.

5. The method of claim 2, wherein when the network side device configures a plurality of groups of pilots for the user equipment and each group of pilots corresponds to a plurality of feedback channels, the method further comprises:
transmitting, by the network side device, any of the plurality of groups of pilots, and indicating the user equipment to feed back the feedback information using any of the plurality of feedback channels corresponding to the any group of pilots, wherein the plurality of feedback channels correspond to different pilot precoding indication information, and the feedback information is pilot index information.

6. A method of indicating a pilot precoding mode, comprising:
receiving, by a user equipment, at least one group of pilots and pilot precoding indication information transmitted by a network side device, wherein each group of pilots comprises at least one pilot, and the pilot precoding indication information indicates whether the at least one pilot in the at least one group of pilots uses a same precoding matrix; and
determining, by the user equipment, whether to feed back pilot index information to the network side device based on the pilot precoding indication information.

7. The method of claim 6, wherein after the user equipment determines whether to feed back the pilot index information to the network side device based on the pilot precoding indication information, the method further comprises:
if so, feeding back, by the user equipment, the pilot index information to the network side device through at least one feedback channel, wherein the at least one feedback channel is configured by the network side device for the user equipment and corresponds to the at least one group of pilots.

8. The method of claim 7, wherein when the network side device configures one group of pilots for the user equipment and the one group of pilots corresponds to one feedback channel, the method further comprises:
receiving, by the user equipment, the one group of pilots and pilot precoding indication information corresponding to the one group of pilots; and
feeding back, by the user equipment, the pilot index information to the network side device through the one feedback channel when the user equipment determines to feed back the pilot index information.

9. The method of claim 7, wherein when the network side device configures a plurality of groups of pilots for the user equipment and the plurality of groups of pilots correspond to a same feedback channel, the method further comprises:
receiving, by the user equipment, each of the plurality of groups of pilots and pilot precoding indication information corresponding to the each group of pilots successively; and
feeding back, by the user equipment, the pilot index information through the same feedback channel successively when the user equipment determines to feed back the pilot index information.

10. The method of claim 7, wherein when the network side device configures a plurality of groups of pilots for the user equipment and each group of pilots corresponds to a plurality of feedback channels, the method further comprises:
receiving, by the user equipment, any of the plurality of groups of pilots, and feeding back the pilot index information using any of the plurality of feedback channels corresponding to the any group of pilots indicated by the network side device, wherein the plurality of feedback channels correspond to the different pilot precoding indication information.

11. A network side device, comprising: a memory and a processor, wherein:
the processor is configured to read programs in the memory to:
configure at least one group of pilots for a user equipment, wherein each group of pilots comprises at least one pilot;
to determine pilot precoding indication information of the at least one group of pilots, wherein the pilot precoding indication information indicates whether the at least one pilot in the each group of pilots uses a same precoding matrix; and
transmit the at least one group of pilots and the pilot precoding indication information to the user equipment.

12. A user equipment, comprising: a memory and a processor, wherein the processor is configured to read programs in the memory to perform the method of claim 6.

13. A non-transitory computer readable storage medium storing a computer program thereon, wherein the computer program, when executed by a processor, performs the method of claim 1.

14. A non-transitory computer readable storage medium storing a computer program thereon, wherein the computer program, when executed by a processor, performs the method of claim 6.

* * * * *